J. M. DODGE.
CHAIN LINK.
APPLICATION FILED MAY 16, 1910.
1,094,200. Patented Apr. 21, 1914.
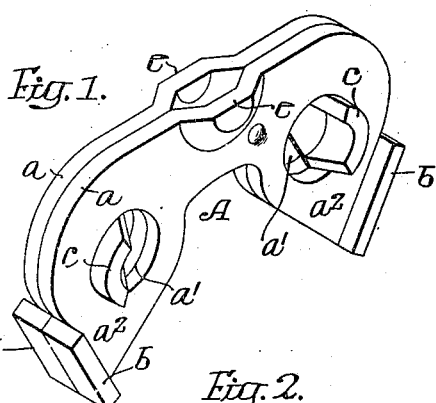
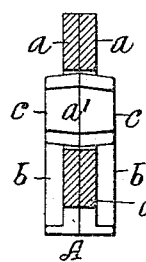
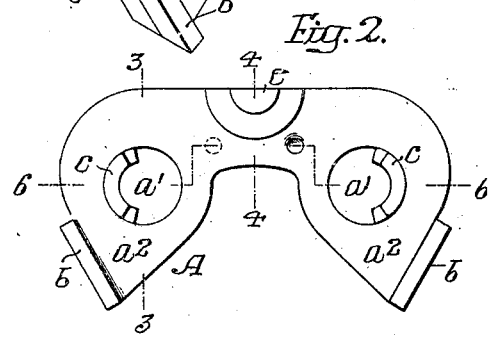
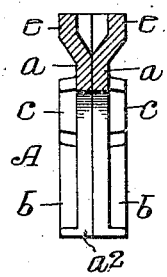
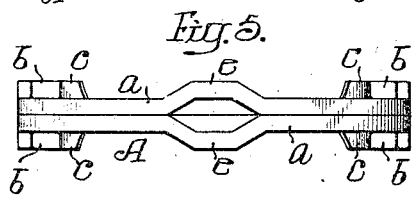
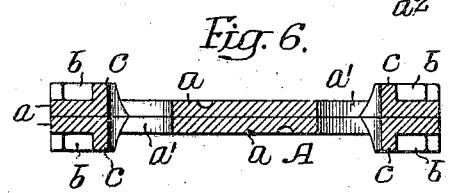
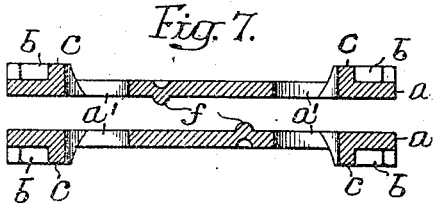
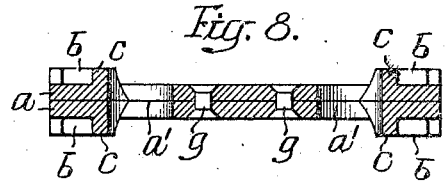
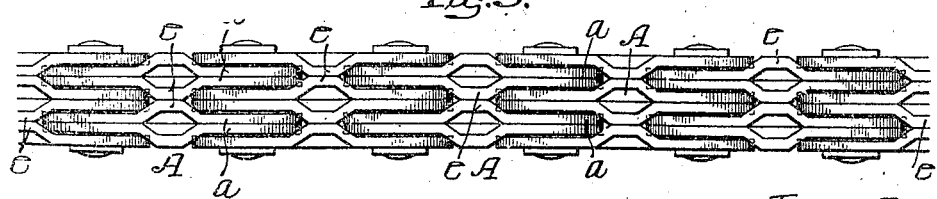
Witnesses—
William H. Rivoir
Wills A. Burrows
Inventor—
James M. Dodge.
by his Attorneys
Howson & Howson

UNITED STATES PATENT OFFICE.

JAMES M. DODGE, OF PHILADELPHIA, PENNSYLVANIA, ASSIGNOR TO LINK-BELT COMPANY, OF CHICAGO, ILLINOIS, A CORPORATION OF ILLINOIS.

CHAIN-LINK.

1,094,200.　　　　　Specification of Letters Patent.　　Patented Apr. 21, 1914.

Continuation of application Serial No. 531,799, filed December 7, 1909. This application filed May 16, 1910. Serial No. 561,649.

*To all whom it may concern:*

Be it known that I, JAMES M. DODGE, a citizen of the United States, residing in Philadelphia, Pennsylvania, have invented certain Improvements in Chain-Links, of which the following is a specification.

My invention relates to certain improvements in drive chains having teeth which engage the teeth of a sprocket wheel. In this type of chain each link is made up of a series of elements, the elements being made from sheet metal and preferably arranged in pairs, one pair of elements of one link alternating with a pair of elements of a link to which it is coupled.

One object of my invention is to make the link elements more rigid than heretofore and to insure proper alinement of the bearing faces of the link elements of each pair, and a further object is to provide an extended bearing for the teeth upon the sprocket wheel.

This application is a continuance of the application filed Dec. 7, 1909, Serial No. 531,799.

In the accompanying drawing:—Figure 1, is a perspective view of my improved chain link element; Fig. 2, is a side view; Fig. 3, is a sectional view on the line 3—3, Fig. 2; Fig. 4, is a sectional view on the line 4—4, Fig. 2; Fig. 5, is a plan view; Fig. 6, is a sectional view on the line 6—6, Fig. 2; Fig. 7, is a view showing two sections of the link element before being welded together;
Fig. 8, is a sectional view of a modification; and Fig. 9, is a plan view, showing a chain made in accordance with my invention.

Referring in the first instance to Figs. 1 to 4, A is a link element made up of two sections $a$, $a$. One section is identical with the other and made by the same dies. $a'$, $a'$ are the perforations for the pivot pin, and projecting from one side of each section is an extended bearing $c$. $a^2$, $a^2$, in the present instance, are teeth which engage the teeth of a sprocket wheel, and I form on the working surface of each tooth an extended bearing by bending the material of the link at right angles, thus forming the bearings $b$, $b$. I also preferably bend the upper edges of the links at $e$, $e$ to form projections. The projections $e$, extended bearings $c$ and the extended bearings $b$ all project substantially the same distance from the side of the link element and are preferably longer than the width of the link elements with which they are coupled, so that when the link elements are assembled the projecting portions $e$, $c$ and $b$ abut against one another and prevent the sides of the links coming in close contact with the links with which they are coupled, thus materially avoiding side friction. It is not necessary that both extended bearings $c$ and $b$ abut the extended bearings of the other elements, but either one or the other should be so formed that there will be a three point contact holding the links in proper position.

The two sections of the link elements are preferably secured permanently together by welding, as illustrated in Figs. 6 and 7. In this instance the point welding process is used, projections $f$ being formed on each link section, as illustrated in Fig. 7, and then pressure is applied during the electric welding, so that the two sections are firmly secured one to the other, as illustrated in Fig. 6. By this arrangement I insure the proper alinement of the extended bearings $c$, $c$ of each link section, as well as the extended bearings $b$, $b$ of the teeth.

In some instances instead of electrically welding the sections they may be riveted, as shown in Fig. 8. The rivets $g$ pass through perforations in the link sections, after which they are riveted in the ordinary manner.

I do not claim, in this application, a side bearing intermediate of the extended bearings, as this is set forth and claimed in a pending application Serial No. 526,536, filed by me on the sixth day of November 1909, nor do I, in this application, claim the laterally extended tooth bearings in themselves, as these are described and claimed in an application for patent filed by Harold S. Pierce on June 9th, 1909, under Serial No. 501,054.

I claim:—

1. A chain link element consisting of two sections rigidly secured together, each section having an outwardly projecting bearing extending beyond its plane and alining with the bearing of the other section.

2. A chain link made up of two sections rigidly secured together, each section having two perforations for the pivot pins and two teeth, the teeth and the perforations of one section alining with those of the other section, each section having extended bearings on one side at the pivot perforations and at the working edge of the teeth.

3. A chain link made up of two sections integrally connected together and each section having projections on one side while being plain on the other side.

4. A chain link element consisting of two rigidly connected parallel plates, each having alining openings and provided with laterally extending bearings adjacent said openings, said bearings at each opening projecting on opposite sides of their respective plates.

5. A chain link element consisting of two rigidly connected plates having openings and laterally extending bearings adjacent said openings, with projections on the plates intermediate of said openings and extending in opposite directions on the two plates.

6. The combination in a chain, of a series of link elements, each formed of two rigidly connected plates, and means for movably connecting said elements, each element having two oppositely extended lateral projections adjacent its middle portions.

In testimony whereof, I have signed my name to this specification, in the presence of two subscribing witnesses.

JAMES M. DODGE.

Witnesses:
 HENRY THOMSON,
 WM. A. BARR.